United States Patent [19]
Sonnenrein

[11] Patent Number: 5,505,862
[45] Date of Patent: Apr. 9, 1996

[54] METHOD FOR SEWAGE CLARIFICATION

[76] Inventor: Uwe Sonnenrein, Paulusstrasse 10, D-4795 Delbrück, Germany

[21] Appl. No.: 167,632

[22] Filed: Dec. 14, 1993

Related U.S. Application Data

[63] Continuation of PCT/DE92/00485, Jun. 9, 1992.

[30] Foreign Application Priority Data

Jun. 14, 1991 [DE] Germany .......................... 41 19 718.6
Nov. 25, 1991 [DE] Germany .......................... 41 38 695.7
Dec. 11, 1991 [DE] Germany .......................... 41 40 877.2
Apr. 23, 1992 [DE] Germany .......................... 9205523 U

[51] Int. Cl.$^6$ ..................................................... C02F 3/30
[52] U.S. Cl. ........................ 210/608; 210/614; 210/624; 210/630
[58] Field of Search .................................. 210/608, 630, 210/607, 614, 621–629, 631

[56] References Cited

U.S. PATENT DOCUMENTS 4,976,863  11/1990  Stearns ................................. 210/608
5,364,529  11/1994  Morin et al. ......................... 210/608

Primary Examiner—Thom Wyse
Attorney, Agent, or Firm—Herbert L. Lerner; Laurence A. Greenberg

[57] ABSTRACT

In a method and a device for sewage purification, sewage is purified by continuously passing it through several stages of treatment, wherein the passage of sewage is regulated by a process control device and is monitored by sensors. Treatment ensues in physical processing stages, pre-flotation stages, two-step biological clarification stages and one post-flotation stage. The pre-flotation stages as well as the biological clarification stages are each provided with gas-water mixers, and the pre-flotation stages, the biological clarification stages and the post-flotation stage are provided with solid foam separators having outlet channels. Clear water from a clear water overflow basin is supplied to the individual stages through the gas-water mixers and through a clear water return pipe. It is also possible to provide chemical treatment prior to biological clearing, to provide clear water recycling for additional treatment, and to provide solids treatment and a reduction stage. An aquatritor, a bioreactor and a four chamber system are also provided. This method is also suitable for use in a portable device having a compact construction.

15 Claims, 11 Drawing Sheets

METHOD FOR SEWAGE CLARIFICATION

CROSS-REFERENCE TO RELATED APPLICATION

This application is a Continuation of International Application PCT/DE92/00485, filed Jun. 9, 1992.

BACKGROUND OF THE INVENTION

1. Field of the Invention

The invention related to a method for clarifying any sewage containing decomposable solid matter by means of continuous sewage-treatment in physical processing stages equipped with assigned solid matter separators in the form of a coarse-matter separator, a fine-matter separator as well as a downstream heavy medium separator with following flotation-stages, from which solid-matter foam that has been developed by using impact mixing valves or gas-water mixers, is separated. The invention also relates to a device to performing the method and an aerator for the sewage.

The known methods for sewage clarification which apply several clarification processes in sequence, are mainly executed at stationary plants. The structural configuration of such plants is costly and they have a high space requirement as well as a dependence on steady solid matter and load factors. Transportable devices generally are based on a filtering technique extended by either chemical or biological treatment. Therefore, the planned use thereof is limited to one type of sewage. Each filtering technology, operating individually or as the main emphasis, causes an increase of contamination in the neglected part. Physical filtering techniques dissolve additional matter by abrasion or turbulent flow. Biological clearing stages cause an increase of physical water contamination in the form of dead and living substances such as biomasses, sewage fungi and parasites. Chemical clearing through additives, after a previous elimination of all other polluting materials to the greatest possible extent, causes an extraordinary quantity of highly contaminated waste.

When purposefully used in special ranges for special sewage and operated as required, each method achieves good results. However, a satisfactory total clearing, especially of different types of sewage, in accordance with regulations regarding clarified-water effluence, can not be achieved that way.

SUMMARY OF THE INVENTION

It is accordingly an object of the invention to provide a method and a device for sewage clarification of any type of sewage, which overcomes the hereinafore-mentioned disadvantages of the heretofore-known methods and devices of this general type, which is manufactured in series, is suitable for use in a transportable device with a compact construction or for stationary use in a modular structure, and has a general process control which automatically adapts the clearing methods in the case of new conditions to variable sewage flow and changes in the sewage water contents.

With the foregoing and other objects in view there is provided, in accordance with the invention, in a method for clarifying any sewage containing decomposable solid matter by means of continuous sewage-treatment in physical processing stages equipped with assigned solid matter separators including a coarse-matter separator, a fine-matter separator and a heavy medium separator with flotation-stages disposed downstream, from which solid-matter-foam having been developed by using gas-water mixers or impact mixing valves is separated, the improvement which comprises subjecting the sewage to an aerobic and a downstream anaerobic sewage treatment with repeated precisely controlled industrial process circulation through assigned bypasses in individual clearing stages in which sewage water suctioned off from the aerobic biological clearing stage leads back together with a mixture of commercial oxygen from a gas-water mixer and clear water into the aerobic biological clearing stage; and monitoring the sewage flow through the individual treatment stages with sensors and feeding determined values to a process control unit for processing with following flow control.

In accordance with another mode of the invention, there is provided a method which comprises additionally chemically treating impurities such as in industrial waste with gas such as commercial oxygen, to biological clearing.

In accordance with a further mode of the invention, there is provided a method which comprises treating solids and foam to reduce a final volume of sludge or disposable waste in an additional biological clearing stage with aerobic and anaerobic treatment and discharging wet solids for further treatment or land fill.

With the objects of the invention in view, there is also provided a device for clarifying any sewage containing decomposable solid matter, comprising a reservoir, a clarified water discharge basin, and a clarified water recirculating line leading from the clarified water discharge basin to the reservoir, the gas-water mixers bypassing the clarified water recirculating line.

In accordance with another feature of the invention, the fine matter separator includes a cylindrical pipe carrying a current in a given direction and having a wall with a multiplicity of holes and perforations formed therein a grid, and a spiral brush rotating in the cylindrical pipe with helical threads being narrower as seen in a countercurrent direction.

In accordance with a further feature of the invention, the aerobic biological clearing stage includes a vertically standing hollow body having a bottom region, an upper part, a top cover, an upper edge region, a sewage water supply connected to the bottom region, a water discharge at the top cover or at the upper edge region, and a bypass connecting the upper part with the bottom region.

In accordance with an added feature of the invention, the one of the physical processing stages is a sedimentation basin, and the sedimentation basin and the floatation stages are part of an aquatritor.

In accordance with an additional feature of the invention, the flotation-stages include a mixing basin in the form of a four chamber system.

In accordance with yet another feature of the invention, the biological clearing stages are combined into a bioreactor.

In accordance with yet a further feature of the invention, there is provided an additional biological clearing stage having means for aerobic and anaerobic treatment, for treating solids and foam to reduce a final volume of sludge or disposable waste and discharging wet solids for further treatment or land fill.

With the objects of the invention in view, there is additionally provided a device for aerating sewage water, comprising a closed vessel having an upper inlet for light medium, a lower inlet for a fluidic mixture or blend, a feed pipe for sewage water, and a cylindrical nozzle body communicating with the light medium, the nozzle body having a nozzle base, a nozzle trunk connected to the nozzle base, an axial through bore in the nozzle base leading into a nozzle outlet chamber in the nozzle trunk, and a nozzle tip or valve being disposed on the nozzle trunk and defining an annular impact chamber between the nozzle tip and the nozzle trunk leading into an annular nozzle, the annular nozzle having a nozzle gap in the shape of a truncated envelope of a cone being adjustable in width and leading into the nozzle outlet chamber.

The device operating in accordance with the method of the invention permits the recordation or logging of monitoring data and permits a continuous operating sequence control through data storage, data processing and remote data transmission. Required chemicals can be metered and purposeful added and thereby possibly resulting particular waste sludge can be skimmed separately. The operating costs for the method according to the invention are low, since the method is carried out in a low-maintenance manner and all of the components are low-wear or wear-free.

Other features which are considered as characteristic for the invention are set forth in the appended claims.

Although the invention is illustrated and described herein as embodied in a method and a device for sewage clarification, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
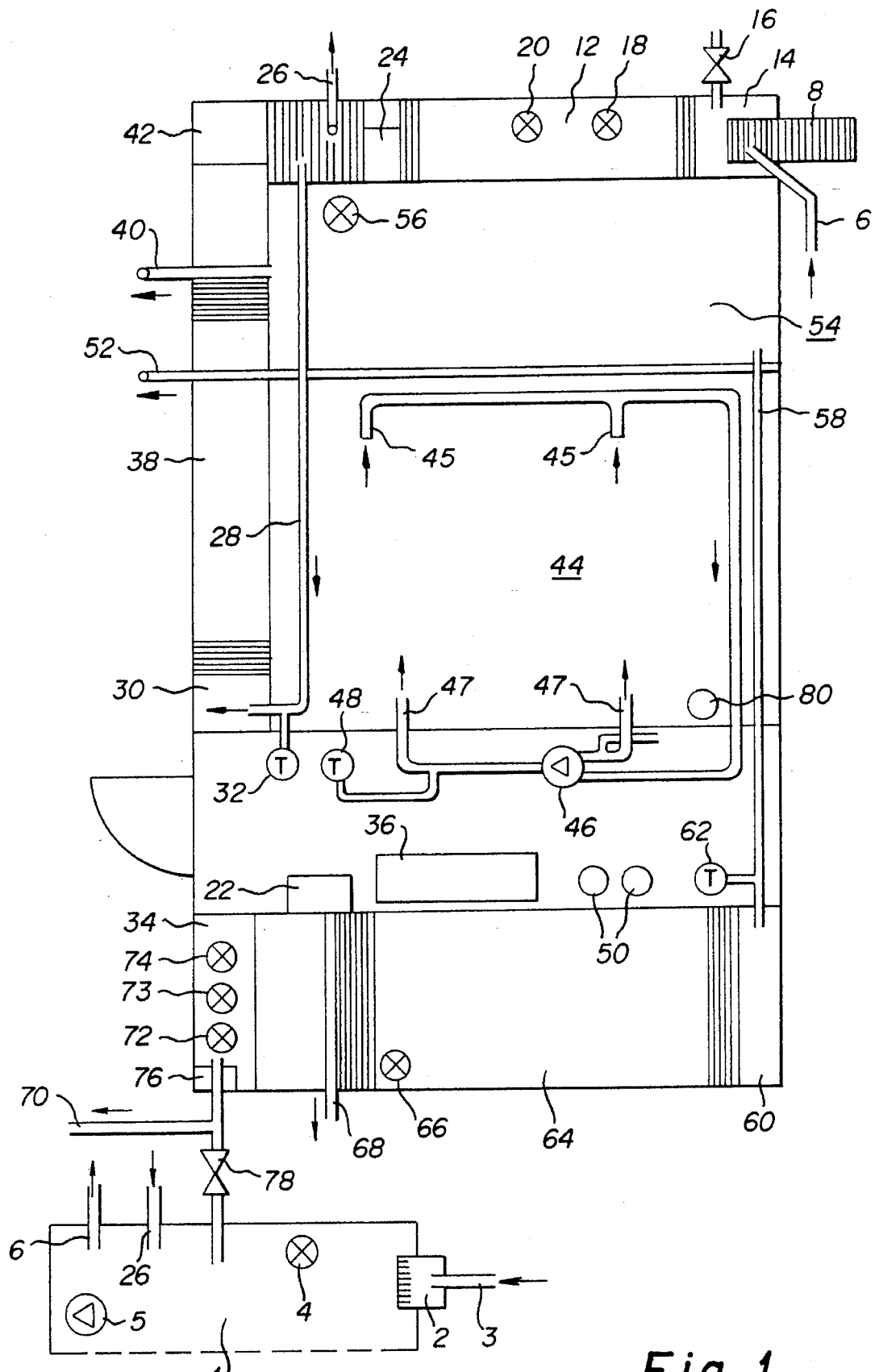
FIG. 1 is a diagrammatic view of a transportable device in a compact construction.
Figure 2:
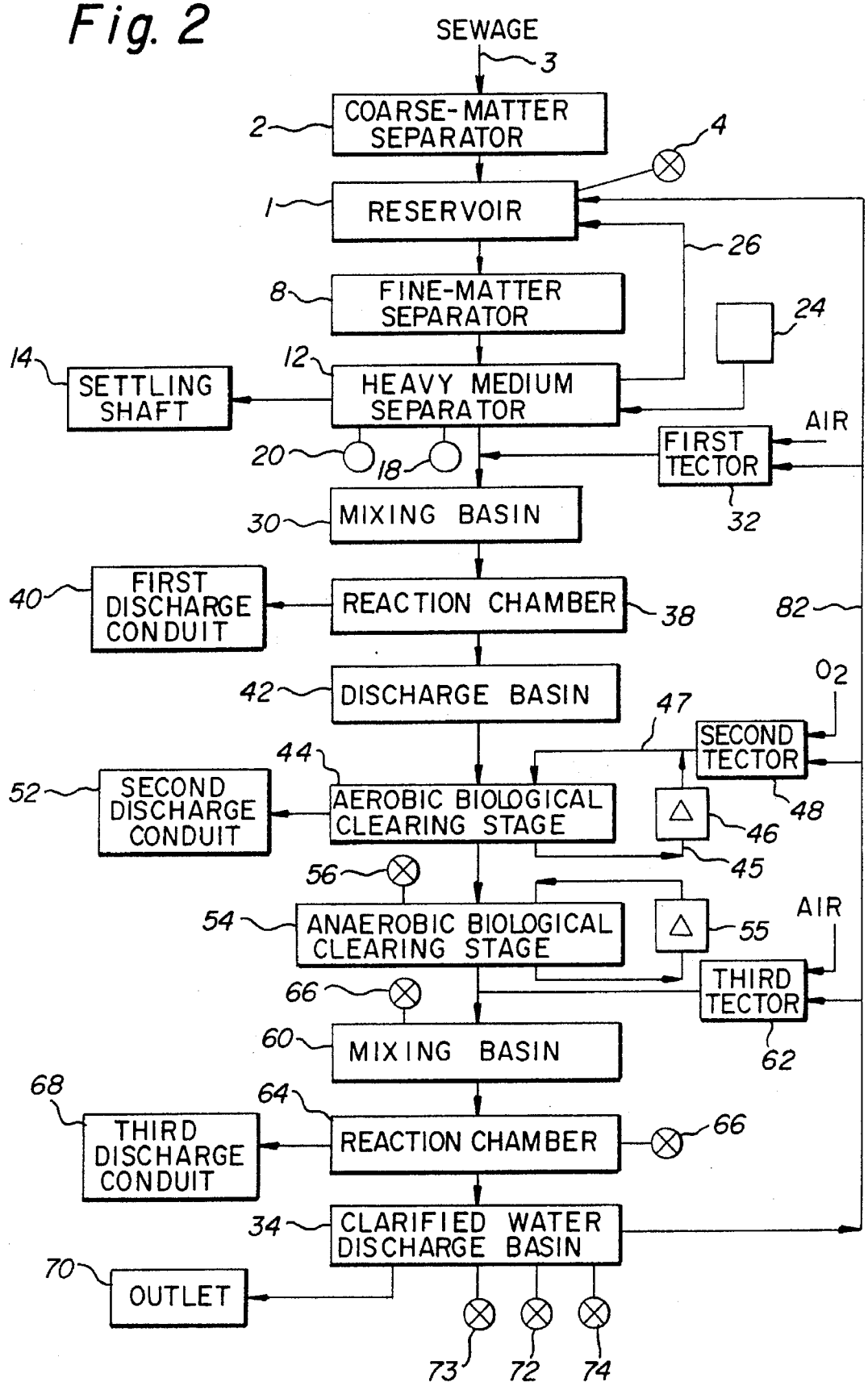
FIG. 2 is a flowchart of the method in accordance with the invention.

Referring now in detail to the figures of the drawing, each of which should be read with the flow chart of FIG. 2, and first, particularly, to FIG. 1 thereof, there is seen a reservoir 1 with a capacity of, for example, 30 cubic meters together with a coarse-matter separator 2, which are connected upstream of a compactly constructed device for sewage clarification. The sewage is supplied to the coarse-matter separator 2 by a water conduit 3. The coarse-matter separator 2 advantageously is provided with a 3 to 5 mm grid. A sensor 4 sends values regarding a measured water level in the reservoir 1 to a process control 22 and a pump 5 delivers the sewage through a pipe 6 to a fine-matter separator 8 provided with a 1 to 2 mm grid, in a first region of the compactly constructed installation. From there the sewage, which is cleared of coarse matter, is delivered to a heavy matter sedimentation basin 12, where heavy matter which is <1 to 2 mm and is heavier than water, sinks down into a settling shaft 14 from which they are regularly drained through a waste valve 16, manually or through a process control. A water level indicator 18 and a pH-meter 20 continuously control water level and hydrogen ion concentration in the heavy matter sedimentation basin 12 and transmit the values to the process control 22 which logs and processes them and other measured values. A lime and acid dosimeter 24 passes amounts of substance determined by the process control 22 into the physically treated sewage. A waste pipe 26 passes surplus sewage into the reservoir 1. A discharge basin 42 is also shown.

The sewage is passed through a pipe 28 from the heavy matter basin or separator 12 into a mixing basin 30 which is part of a pre-flotation apparatus. Immediately before being led into the mixing basin 30, aerated water is admixed to the sewage by a first impact mixing valve or gas-water mixer 32, which will be referred to below as a "tector". The tector 32 operates based on a bypass principle, it receives the mixed water from a clear water discharge basin 34 of a reflotation apparatus and it receives the air from a compressor 36. The water, which is enriched with air bubbles, flows through a reactor chamber 38. In this way, solid matter foam precipitations are generated on the surface which are pushed into a first discharge conduit 40 by a foam skimmer, in a manner which is process controlled and performed at regular time intervals. The sewage is conducted into an aerobic biological clearing stage 44 through a pre-flotation discharge basin 44. At this point, the sewage already has been cleared from 95–99% of all solid matter, so that essentially only dissolved matter come to the biological clearing stages. The effectiveness of the biological clearing stages is multiplied by means of the thorough physical pre-clearing. Inside the aerobic biological clearing stage 44, which is constructed as a fluidized bed filter, the sewage is constantly suctioned off by means of a pipe system 45, then brought back to the clearing stage 44 by means of a pump 46 and a pipe system 47, and is constantly supplied by a second tector 48 with commercial oxygen from oxygen bottles 50 and mixed water from the cleared water reflotation discharge basin 34. The sewage can be circulated up to ten times per hour and reaches a controllable high oxygen enrichment which may be many times higher than the normal degree of oxygen saturation. All tectors are run in bypass operation to keep the decompression valves operating troublefree. The dead biomass or bacterial mass, which is in the aerobic biological clearing stage 44, is precipitated at the surface in the form of solid matter foam and is process-controlled and dredged in a time oriented manner into a second discharge conduit 52, preferable by a chain desludger. Then the sewage is piped through a spillway from the aerobic biological clearing stage 44 into an anaerobic biological clearing stage 54. In this clearing stage, a continuous sewage circulation takes place by means of a pump 55 seen in FIG. 2 and a sensor 56 controls the oxygen saturation or content.

After treatment in the anaerobic biological clearing stage 54, the sewage flows through a pipeline 58 into a mixing basin 60 of the reflotation apparatus. Immediately before flowing into the mixing basin 60, a clear water-air mixture or blend is added to the sewage by a third tector 62. Afterwards the sewage comes into a reflotation reaction chamber 64 where a solid matter precipitation at the surface again takes place. A sensor 66 controls the water level. A desludger dredges the solid matter precipitation into a third discharge conduit 68 in a time-oriented and process-controlled manner. The clarified sewage flows from the reaction chamber 64 into the reflotation clear water discharge basin 34 where a pH-value sensor 72 controls the hydrogen ion concentration and further sensors 73 and 74 control the oxygen saturation and the water temperature. A constant levelling device 76 drains the clarified water flow into an outlet pipeline 70 or through a valve 78 back into the reservoir 1, in which the required clarified water is diverted as mixing water for the impact mixing valves or gas-water mixers 32, 48 and 62, which are the first, second and third tectors. The temperature of the clearing stages 44 and 54 is kept constant by means of process-controlled immersion heaters 80. The process control 22 supervises and logs all of the measured values such as water level, oxygen, pH-values and temperature, and furthermore operates the functions of the pumps, the lime and acid dosimeter, the oxygen concentration, the valve cycles and the desludgers for solid matter foams, and it gives a danger-signal and blocks the discharge of possibly insufficiently clarified sewage in the case of an emergency.

Figure 3:
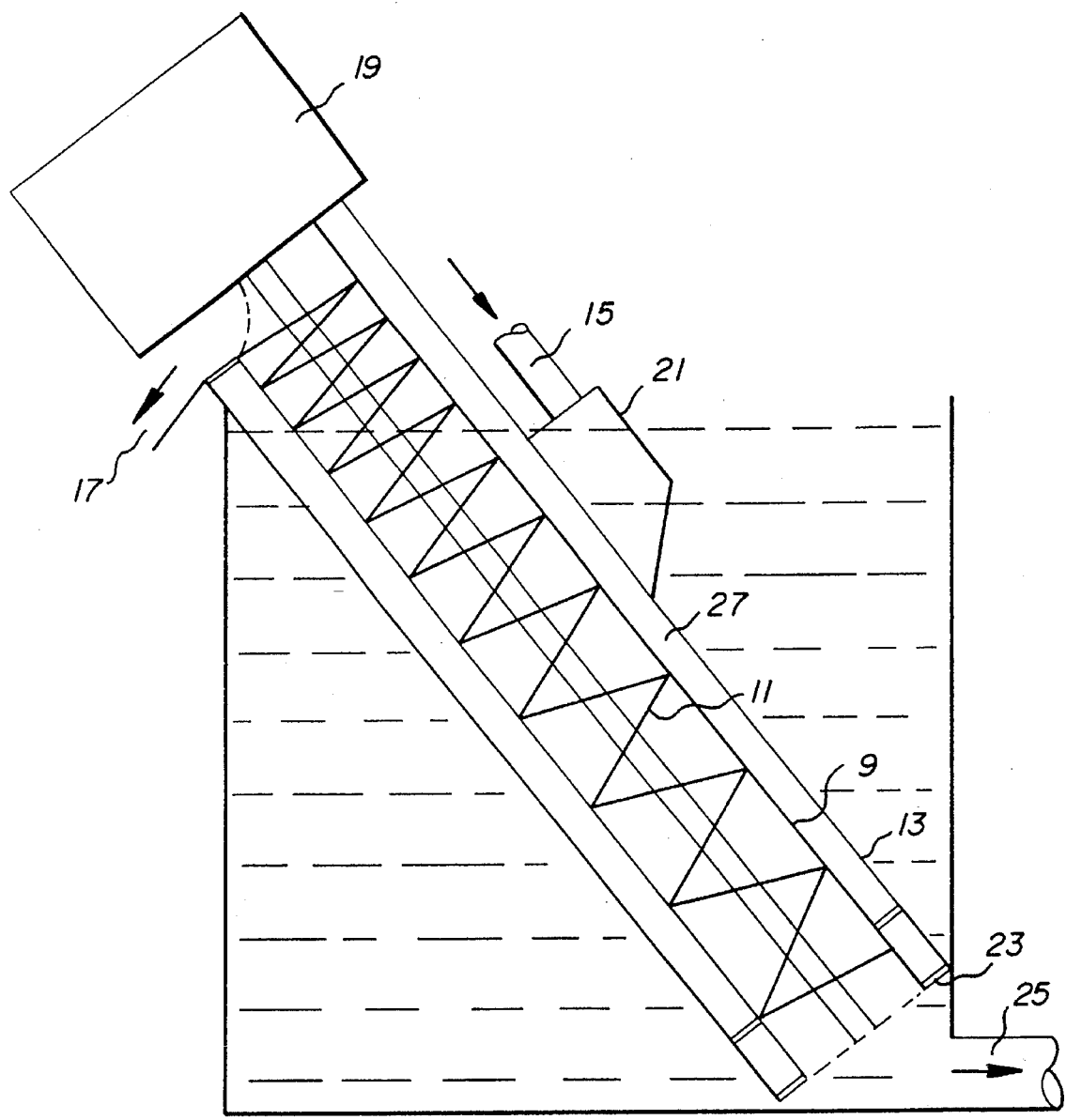
FIG. 3 is a fragmentary, longitudinal-sectional view of a fine-matter separator.

According to FIG. 3, the fine matter separator 8 is formed mainly of a rotating spiral brush 11 which is concentrically mounted in a cylindrical pipe 9. The spiral brush has an inclination beginning at its lower free end and decreasing towards its other end, at which a driving motor 19 with a gear is disposed, i.e. the helical threads of the brush 11 continually become narrower in the direction of the upper end. The wall of the cylindrical pipe 9 is equipped with a multiplicity of holes and perforations formed in a non-illustrated grid, having an opening surface which is adapted to the maximum particle size of the solid matter which is to be separated.

The pipe 9 is concentrically disposed in a jacket pipe 13, which is centrally equipped with a sewage water-intake chamber 21 having a sewage water-inlet pipe 15. The sewage water-inlet pipe 15 is connected to the coarse-matter separator 2. The diameter of the jacket pipe 13 is selected in such a way that a hollow space 27 between the jacket pipe 13 and the outer surface of the inner pipe 9 with its holes and perforations guarantees a safe all-round distribution of the sewage water supplied by the water intake chamber 21. The hollow space 27 between the inner pipe 9 and the jacket-pipe 13 is sealed at a lower end 23 while the inner pipe 9 is open at the lower end and serves as a water-outlet 25. In the upper region of the inner pipe 9 and the jacket-pipe 13 a sludge-drain 17 is provided on one side.

The sewage water is supplied through the water-inlet pipe 15 and the water intake chamber 21 into the hollow space 27 between jacket-pipe 13 and pipe 9 with its holes and perforations formed in a grid. The sewage water flows through the holes and perforations of the pipe 9 into the region of the rotating spiral brush 11 which is driven by the motor 19. While the sewage water flows in the direction of the water-outlet 25 at the lower open end of the pipe 9, the suspended solids, especially the fine matter, are held back by the threads of the spiral brush and are transported upwards through the threads which become more and more narrow.

Due to an increasing amount of solid matter between the helical threads in the direction of the sludge-drain 17 and because of the tightening space, the solid matter is compressed and drained through the sludge-drain 17. Due to its rotation, the spiral brush 11 is self-cleaning. Due to the underwater operation, the solid matter is discharged gently. The abrasion of the spiral brush 11 is less than in flowing-through operation.

Figure 4:
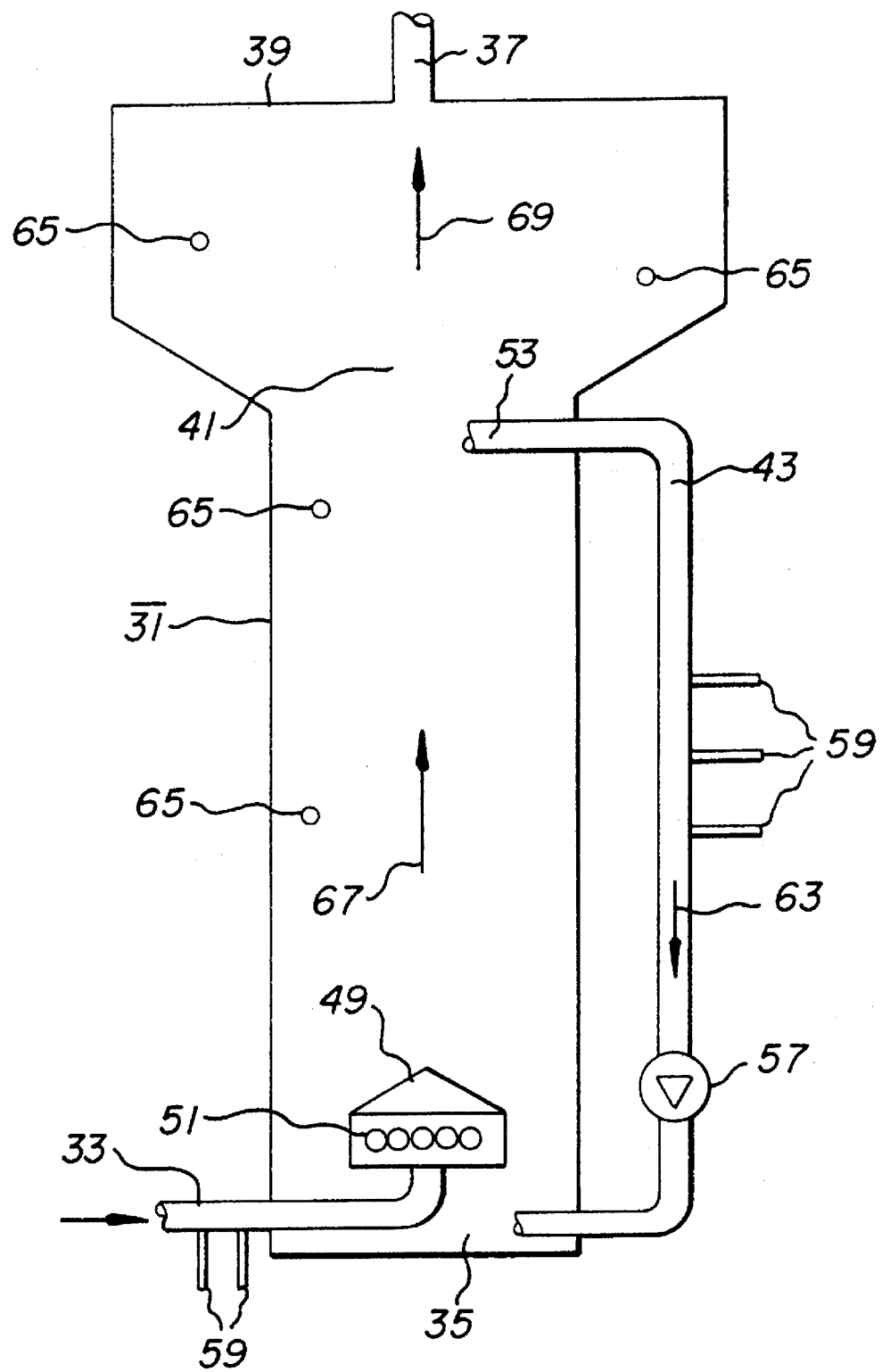
FIG. 4 is a fragmentary, longitudinal-sectional view of an aerobic biological clearing stage.

According to FIG. 4, the aerobic biological clearing stage 44 includes a vertically standing, cylindrical, closed hollow body 31, which is equipped with a sewage water supply 33 at the bottom, a water discharge 37 at a cover 39 and a bypass 43 which connects an upper part 41 of the hollow body 31 with a bottom region 35.

The hollow body 31 may be cylindrical with a circular diameter which is considerably enlarged in its upper third or quarter, wherein a transition to the upper part 41 is funnel-shaped. The sewage water supply 33 discharges into a pressurized discharge or volute chamber 49, having a surface area which has a multiplicity of small outlets 51. The cross-sectional area of the sewage water supply 33 is greater than the sum of the cross-sectional areas of the outlets 51.

The bypass 43, which connects the upper part 41 of the hollow body 31 with the bottom region 35, is equipped with a circulating pump 57 which circulates the sewage water in the direction of an arrow 63. A bypass inlet 53 is attached in such a manner that it suctions off the sewage water at a point of transition to an enlarged diameter. Several injection connections 59 at the sewage water supply 33 and at the bypass 43 are provided, through which pH-dosages, oxygen or other special matter can be added in quantities that can be adjusted and computer controlled through a number of sensors 65.

The hollow body 31 contains special solid matter serving as a carrier or vegetation area for bacteria, e.g. nitrobacteriaceae, which should float in the direction of an arrow 67. The bacteria have the chance to develop unhindered on the solid matter surface. The enlarged diameter of the upper part 41 allows a reduced flow rate to take place, which is symbolized by a shorter arrow 69. The lower flow rate allows lowering or retaining of the solid matter with the bacteria, which are not discharged through water discharge 37 but are recirculated to the bottom area 35 through the bypass 43. Solid matter, which is precipitated at the bottom of the hollow body 31 or which is collected in the bottom area 35, is whirled up by the sewage water which is discharged from the bypass 43 and from the outlets 51 of the pressurized discharge or volute chamber 49. Due to the difference in ratio of the size of the outlets 51 and the effective area of flow of the sewage water supply pipe 33, the sewage water discharges in a pressurized manner through the outlets 51 and is able to whirl up and lift those carriers of the solid matter that are sedimented at the bottom. The sewage water temperature is sensor-monitored and adjusted by means of non-illustrated process-controlled immersion heaters.

Figure 5:
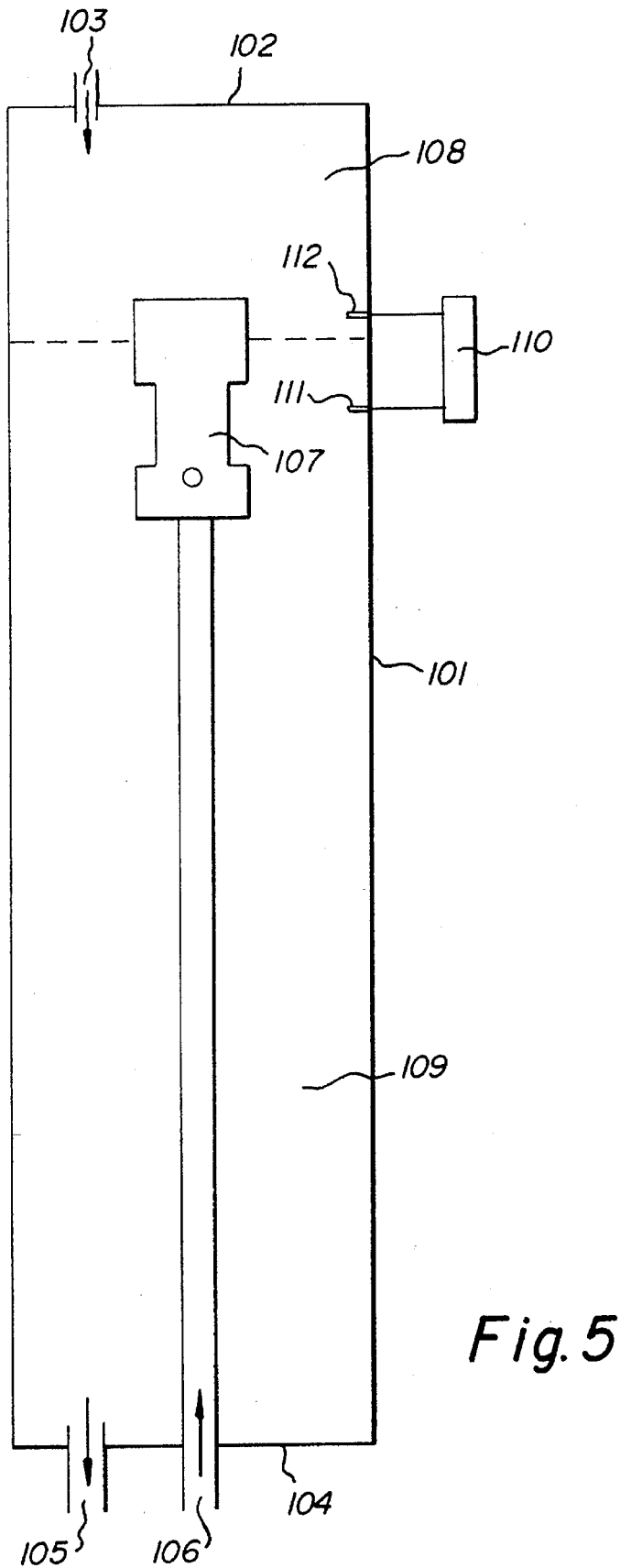
FIG. 5 a simplified view of an aerator.

FIG. 5 shows a vertically standing closed vessel 101 which is cylindrical or cubical and has a cover 102 with a feeding pipe 103 as well as a bottom 104 at which a water discharge 105 is attached besides a feeding pipe 106 that extends into the upper third of the vessel 101 and carries a basically cylindrical nozzle body 107. The fluid, which is to be treated, is piped through the feeding pipe 106 into a nozzle body 107. In an upper region 108 of the vessel 101, the lighter medium, which may be a fluid or a gas, is supplied during the operation of the device as a mixer. In a lower region 109 of the vessel 101, the fluid, which has been treated in the nozzle body 107, collects and is discharged through the water discharge 105.

The difference in the level between the lighter medium in the upper region 108 and the heavier medium in the lower region 109, is monitored by a level gauge 110 which regulates the addition of the lighter medium by means of a non-illustrated electronic control unit, in order to adjust the level between a minimum value 111 and a maximum value 112.

Figure 6:
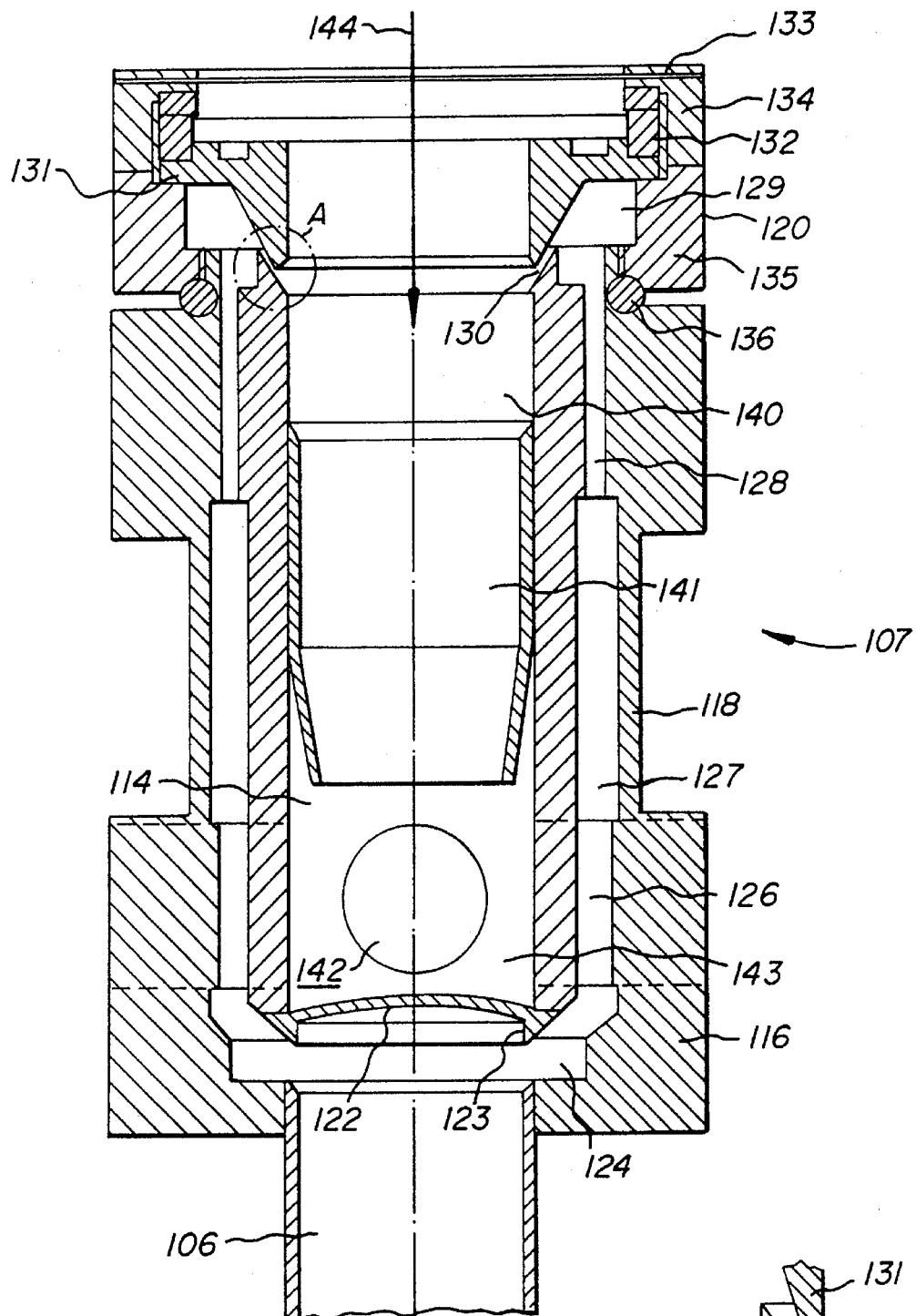
FIG. 6 is a fragmentary, longitudinal-sectional view of an aerator.

As is seen in FIG. 6, the cylindric nozzle body 107 includes a nozzle base 116 and a nozzle trunk 118 which are tightly connected, as well as a multipart screwed-on nozzle tip or valve 120. Besides an arched or conoidal cover plate 122, this complex nozzle body has an axial through bore 114, which approximately corresponds to the outer diameter of the feeding pipe 106 that is connected to the nozzle body 107 at a bottom region of the nozzle base 116. Immediately above the end of the feeding pipe 106, the axial through bore 114 is enlarged by a first ring groove 124 and forms a first distributing chamber. The conoidal cover plate 122 is above a short piece of pipe 123, which forms an annular water-flow breakaway edge together with the upper edge of the nozzle base at the ring groove 124. Beginning at the ring groove 124, a multiplicity of drilled holes 126 extend in axial direction of the nozzle body 107 and end in a long stretched-out second ring groove 127 in the nozzle trunk 118.

Figure 7:
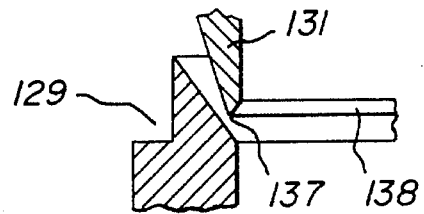
FIG. 7 is an enlarged view of a portion A of FIG. 6.

Following the second ring groove 127 is a multiplicity of drilled holes 128 with a smaller diameter, which form further breakaway edges. These drilled holes 128 lead into a funnel-shaped impact chamber 129 in the nozzle tip or valve 120. An upper edge of the axial through bore 114 of the nozzle trunk 118 is shaped like a truncated envelope of a cone and forms an underpart of a nozzle 130. The upper part 131 of the nozzle together with a flange 132 thereof and a broad rubber ring 133, is clamped between a nozzle-cheek 134 and a screw cap 135 and forms the nozzle tip or valve 120, which is screwed-on to the nozzle trunk 118 together with an inserted rubber ring 136. A desired size of the nozzle gap 137 shown in FIG. 7 is adjusted by tensioning the screw cap 135. The broad rubber ring 133 permits an elastic vertical movement of the upper part 131 of the nozzle. This enables a self-cleaning of the nozzle gap 137. If a part of the nozzle gap 137 should get plugged up, the upper part 131 of the nozzle can be lifted so as to enlarge the nozzle gap 137 so far that despite the dirt accumulation, the required quantity of medium can escape and the dirt accumulation can be scoured through the enlarged nozzle gap. After the cleaning of the nozzle gap 137, the former aperture size is restored by means of the elastic force of the broad rubber ring 133.

As is also shown in the enlarged portion seen in FIG. 7, the inclination of the surface at the nozzle gap 137 is chosen in such a way that the width of the gap decreases in the direction of the top of the upper part 131 of the nozzle. In addition, the edge of the upper part of the nozzle is equipped with a breakaway chamfer 138. In this way, the stream of the nozzle 130 is shaped like an envelope of a cone, having a cone point which points at a point on the center line of the nozzle body 107. In that part of the axial through bore 114 of the nozzle trunk 118, which is referred to as a nozzle-outlet chamber 140, a sleeve 141 is added, having a lower end which is contracted and which ends right above one or several nozzle ends 142. In the drawing, only one nozzle end 142 is shown for the sake of clarity. However, it is advantageous to provide several nozzle ends to keep the fluid discharge unhindered. The conoidal cover plate 122, which is fitted opposite the feeding pipe 106 at the entry of the nozzle base 116, assures that no splash of medium sprinkles back into the nozzle-outlet chamber 149 at the lower end of the nozzle outlet chamber 143, due to its conical shape together with the conically contracted sleeve 141.

When using the device as a mixer, the pressurized fluid is supplied to the nozzle body 107 through the feeding pipe 106 and flows through the first ring groove 124 and several of the drilled holes 126, into the second ring groove 127 and the further drilled holes 128, and into the annular impact chamber 129. The above-mentioned ring grooves and drilled holes are formed behind each other in the jacket of the nozzle body 107. At transition points between the ring grooves and the drilled holes, water-flow breakaway edges are provided, which break up the molecular structure of the fluid. Due to the multiple passage along the water-flow breakaway edges before discharging through the nozzle gap, the fluid is very well prepared to absorb or yield other medium molecules within the nozzle outlet chamber, by means of a thorough loosening of the molecular structure.

The annular impact chamber 129 is followed by the annular nozzle 130 having the nozzle gap 137 that becomes narrower in the direction of the end of the gap. The upper part 131 of the nozzle is shortened in contrast to the lower part of the nozzle and is equipped with the breakaway chamfer. The nozzle generates a stream shaped like a truncated envelope of a cone, which comes from different directions and meets in a central point of impact in the nozzle-outlet chamber 140. In this way, the velocity of impact virtually is doubled. In this case the emitted stream generates a suction in the direction of an arrow 144, through which a lighter medium (liquid or gas), which is suctioned from the upper region 108 seen in FIG. 5 through the nozzle tip or valve 120 having an open top, is blended or mixed with the medium discharging from the impact chamber 129 and the annular nozzle 130, is pushed in the direction of the nozzle end 142 and leads to the lower region 109.

When using the device as a separator for liquids of different density, it is operated by means of suctioning off the heavier medium at the water discharge 105 and the lighter medium at the feeding pipe 103 seen in FIG. 5. With the aid of the suction generated in the nozzle body 107, the medium, which has to be separated, is suctioned through the feeding pipe 106. The annular nozzle 130 generates the stream shaped like a truncated envelope of a cone in the nozzle-outlet chamber 140. In this case the high velocity of impact and the release of energy generate a cloud of the medium, having a molecular structure which is broken up, and which allows particles with a lower particle number density to be suctioned off against the direction of the arrow 144. The particles with a higher particle number density follow the suction coming from the nozzle end 142 and are transported into the lower region. The removal of the lighter and the heavier medium is monitored in the upper region 108 and in the lower region 109 by the level gauge 110 and regulated in such a way that the level between these media is kept between the limiting values, which are given by the minimum value 111 and the maximum value 112.

Through the use of bypass recirculation of clarified water through a clarified water recirculating line or return pipe 82 into the purification process, the bubble diameter and the bubble quantity can be regulated and therefore the flotation in the mixing basin 30 of the pre-flotation apparatus, the aerobic biological clearing stage 44 and the mixing basin 60 of the reflotation apparatus, can be controlled. The process described above is illustrated in the flow chart of FIG. 2 which includes the line 82.

Figure 9:
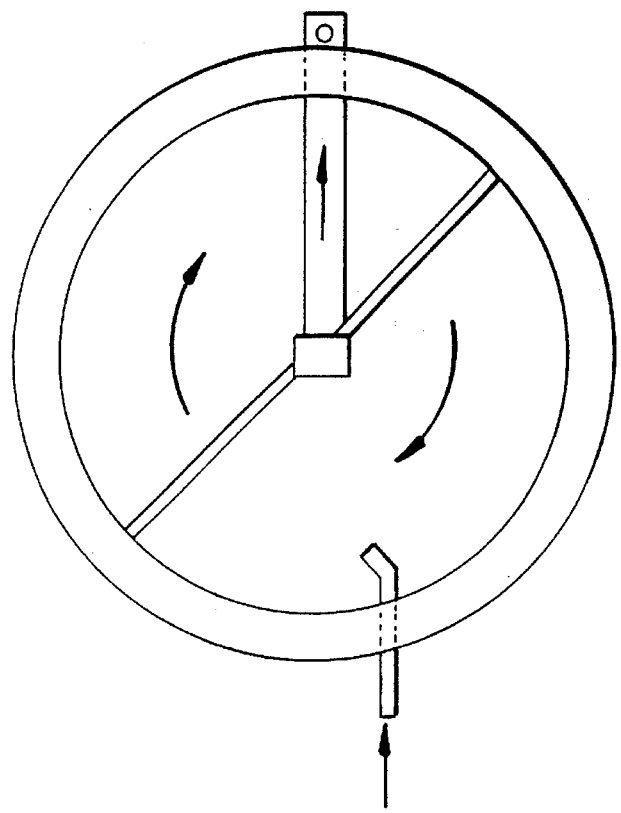
FIGS. 8 and 9 are respective longitudinal-sectional and top-plan views of an aquatritor of the invention.
Figure 8:
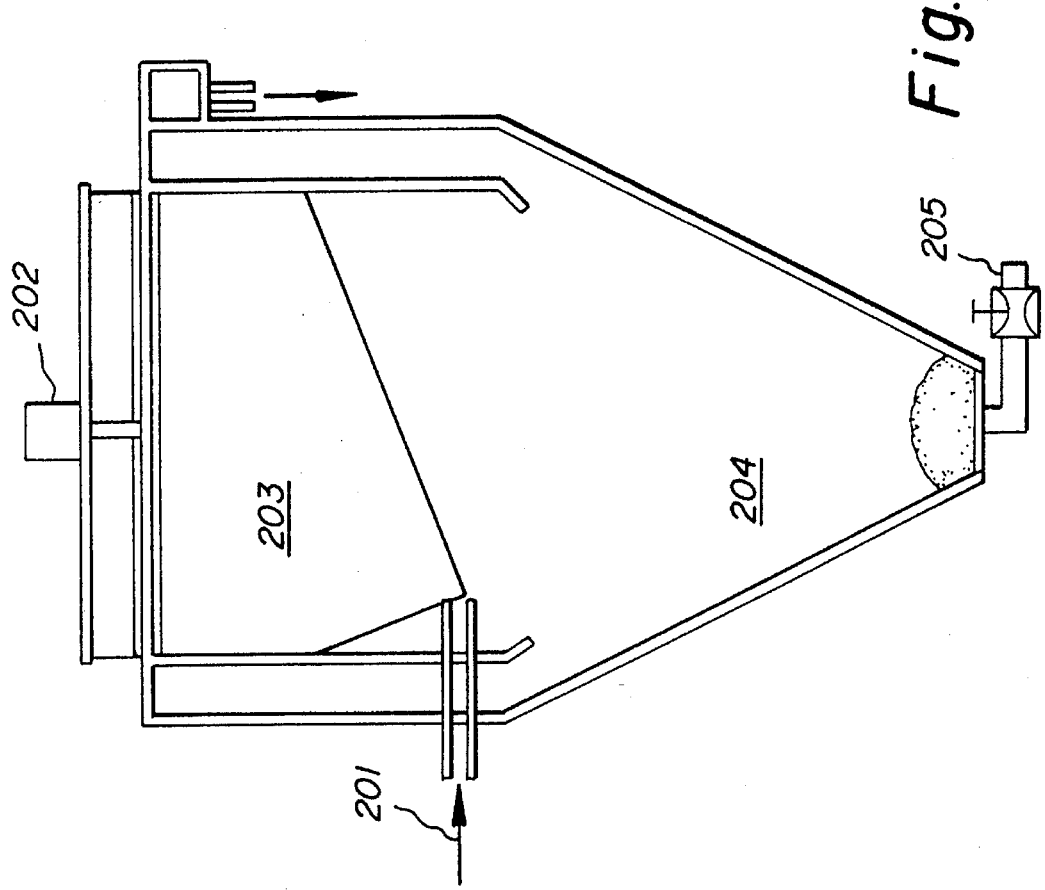

The aquatritor shown in FIGS. 8 and 9 performs three functions, namely physical pressure relief flotation, mechanical deposition of solids by means of sedimentation, and chemical precipitation or flocculation. The aquatritor can be employed for pre-flotation downstream of a sand trap, as a pH-stabilization section downstream of the biological purification, and the flocculation section can be used in case of special requirements made on the degree of purity of the waste water. The aquatritor combines the operation of, and therefore replaces, the floatation device and the sedimentation basin described above with respect to FIGS. 1–6.

The physical pressure relief flotation section is used for the removal of filterable materials as well as for ionizing the waste water. The flotation in the aquatritor is based on the controllable atomization of gases in liquids. The aqua-injector, which is a gas injection system developed by firm AquaPlan, assures an even gas bubble section and even an rising speed, along with an arbitrarily selectable bubble diameter.

Floating materials adhere to the slowly rising microbubbles and are transported by them to the surface of the aquatritor in an area 203 downstream of an inlet 201. The forming foam is carefully moved from there by means of a motor-driven clearing system 202 into a runoff trough in order to be further processed in a sludge processor.

With regard to the mechanical sedimentation, based on the flow conditions generated by the structure of the aqua-tritor, the kinetic energy of the floating materials outside the flotation zone 203 is affected in such a way that they are deposited on the bottom of the aquatritor in an area 204. The sediment is periodically removed through a valve 205 and passed to the sludge processor.

Regarding chemical flocculation, in the case of special requirements or with extremely dirty waste water, the aqua-tritor can also be used as a reaction and flocculation basin. The aqua-injector is used as the system for injecting and mixing chemicals. Flocculation takes place in areas 203 and 204 of the aquatritor during a holding time. Depending on their weight and size, flakes are continuously removed from the waste water by flotation or sedimentation.

Figure 10:
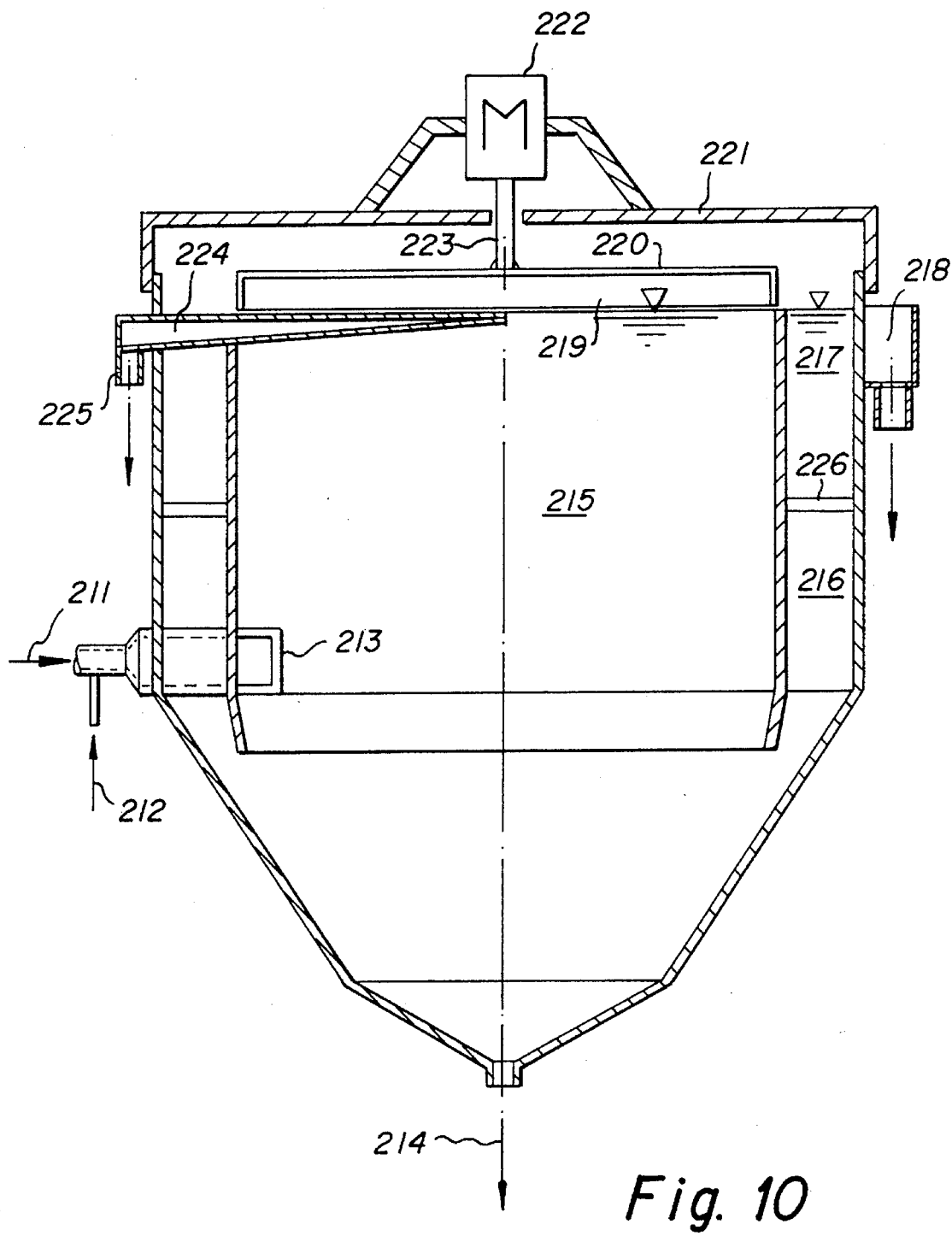
FIG. 10 is an enlarged and more detailed longitudinal-sectional view of the aquatritor of FIG. 8.

The more detailed illustration of the aquatritor in FIG. 10 includes a waste water inlet 211. An inlet 212 of an injector bypass provides water enriched with micro-bubbles, analogously to an aquaseptor (flotation). An inlet connector 213 leading to an interior cylinder generates a tangentially circulating flow. An outlet connector 214 is provided for material which can be sedimented. Reference numeral 215 represents a flotation zone, whereas reference numeral 216 represents an outer ring clear water zone. A height-adjustable slide 217 is used for adjusting a water level. A clear water outlet box 218 is also provided. A blade 219 of a circular removal device removes floating matter from the surface of the liquid into a floating matter run-off trough 224. The blade 219 of the circular removal device has a strap 220. The circular removal device also has a frame 221, a motor 222 and a drive shaft 223. The run-off trough 224 leads to an outlet connector 225 for the floating matter. Finally, a holder 226 is provided for the interior cylinder.

Figure 11:
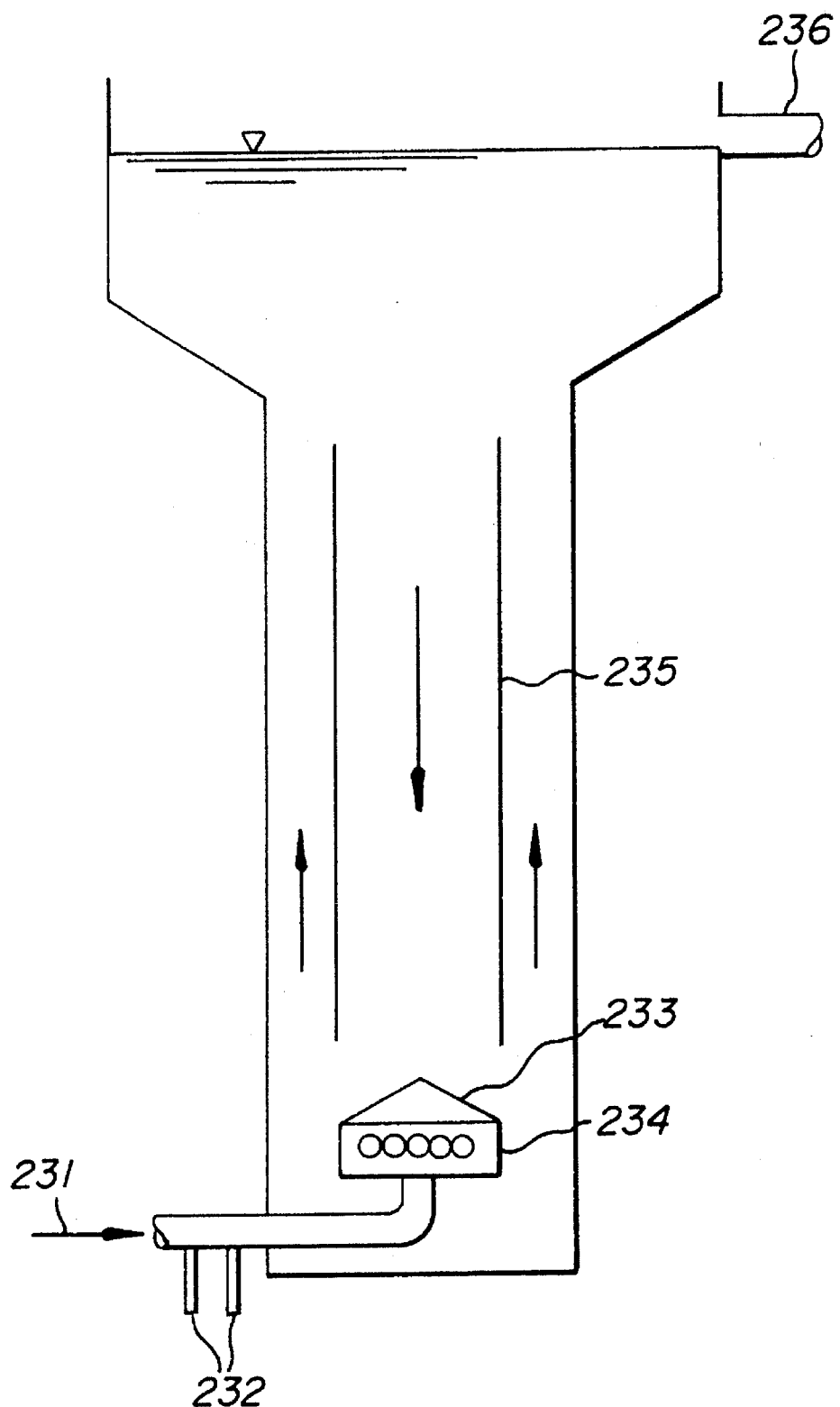
FIG. 11 is a longitudinal-sectional view of a bioreactor of the invention.

FIG. 11 shows that the bioreactor includes a waste water inlet 231 and an inlet 232 for the injector bypass leading to a pressure outflow pot 233 having outlet openings 234. The bioreactor has an inner pipe 235 and a water run-off 236 disposed at the top. The bioreactor replaces the biological clearing stages or reactors 44 and 45 which are described above with regard to FIGS. 1–6.

Figure 12:
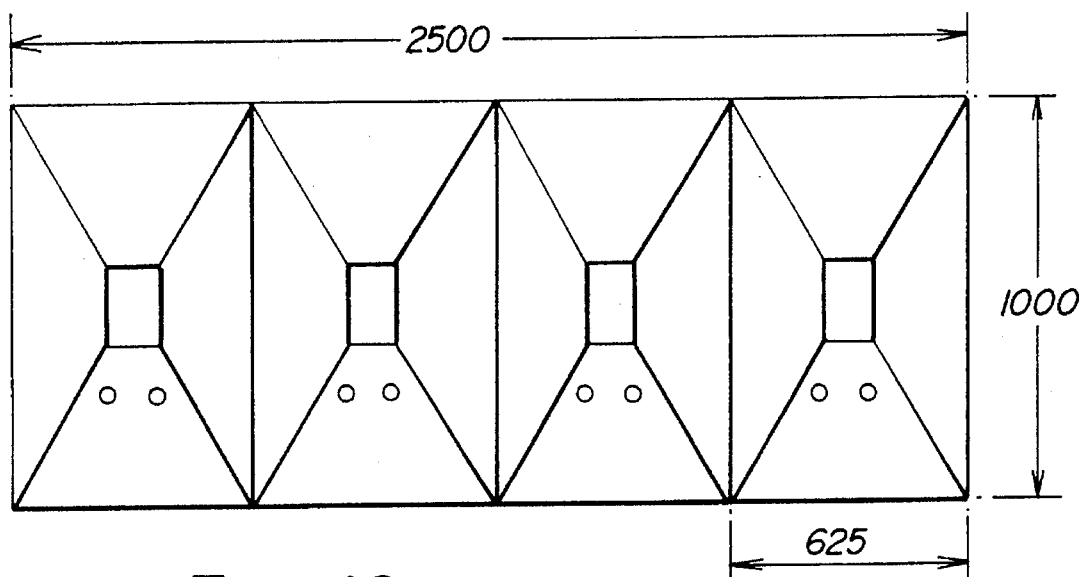
FIGS. 12 and 13 are respective top-plan and longitudinal-sectional views of a four chamber system of the invention.
Figure 13:
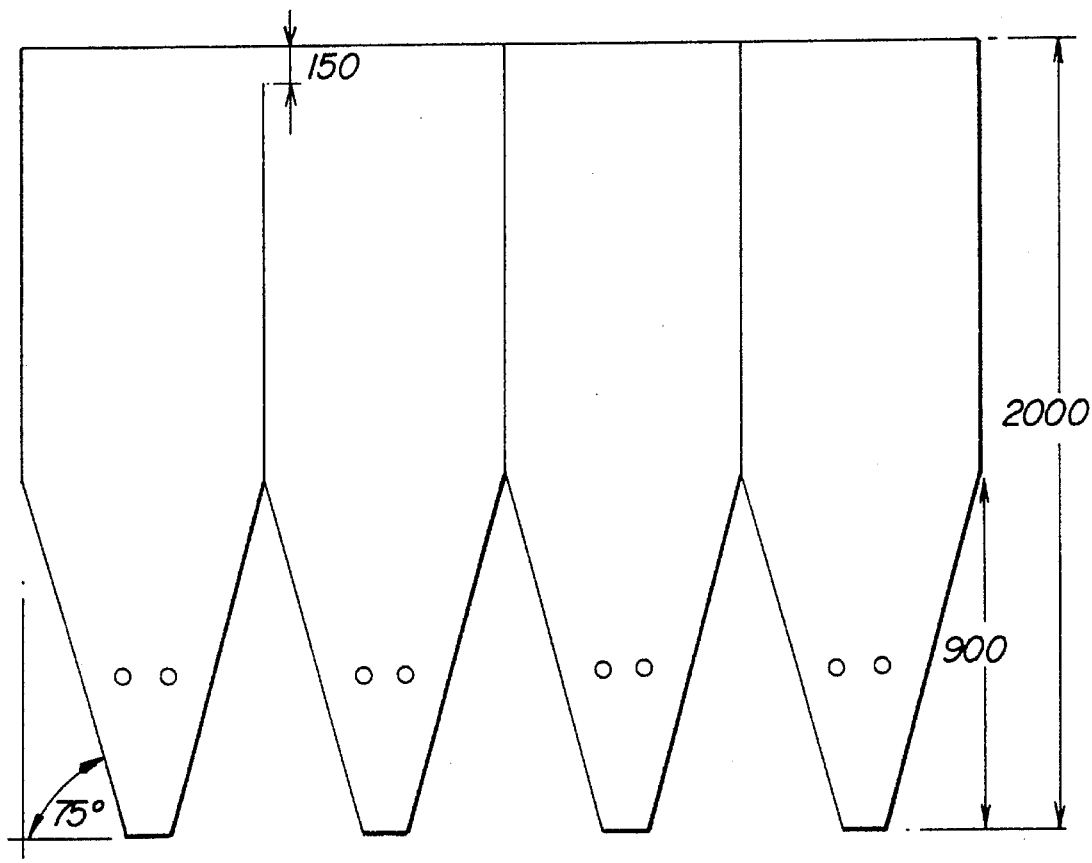
Figure 14:
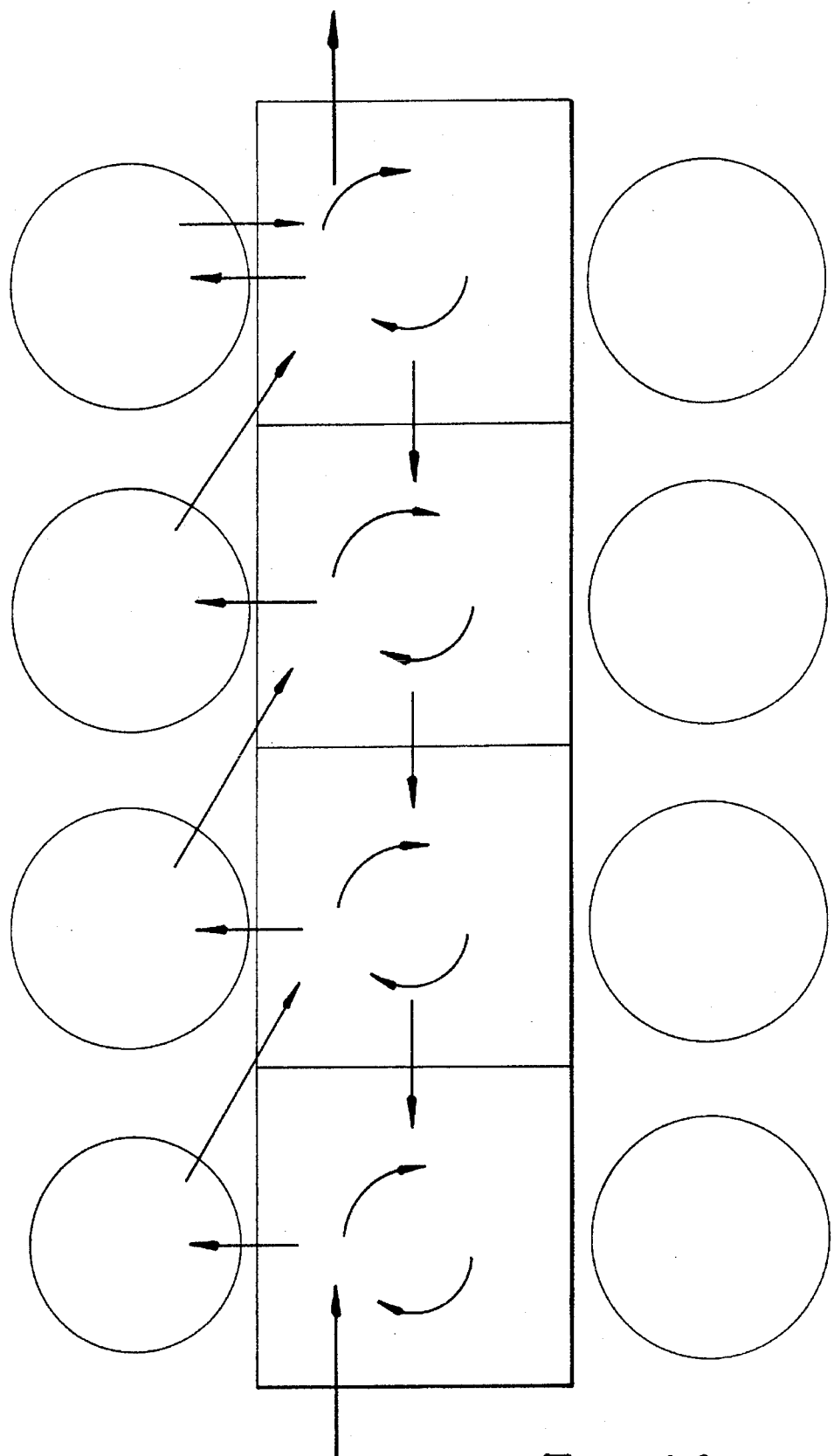
FIG. 14 is a flow chart illustrating the operation of the four chamber system with the bioreactors.

The four chamber system shown in the respective top and side views of FIGS. 12 and 13 and the flow chart shown in FIG. 14 with the bioreactors illustrated as circles outside the chambers, functions as a buffer and builds a connection between the bioreactors. The four chamber system replaces the mixing basin with a single chamber which was discussed with reference to FIGS. 1–6.

The description of the operation of the four chamber system follows the arrows shown in the flow chart of FIG. 14. Water streams tangential into a first chamber from a preclearing stage. A circulating flow direction then takes place. Reactor pumps draw off water from the downstream side of the chamber and supply the reactor with a continuous flow.

Due to the use of a small reactor outlet pipe in comparison with an overflow edge between the chambers, the speed of the flow from the reactor outlet is much stronger than the flow between the chambers. This induces a vertical flow from the surface to the bottom of the chamber from where the waste water will be drawn off again.

In the case of the flow between the chambers, it is important to know that the illustrated baffles become higher as seen from one chamber to the other. It is enough to only increase the baffle height by ½ to 1 cm. The water level tries to reach the same height, conditioned on the open channel system. This prevents movement of amounts of waste water from one chamber into the other without going through the bioreactor.

Manually operated submersible sludge pumps are installed on the bottom of each chamber in the case of sand leaving the reactors and entering into the chambers.

The reaction that takes place in the four chamber system is only an attenuated reaction of the bioreactors because the concentration of microorganisms and oxygen is low.

I claim:

1. In a method for clarifying any sewage containing decomposable solid matter by means of continuous sewage-treatment in physical processing stages equipped with assigned solid matter separators including a coarse-matter separator, a fine-matter separator and a heavy medium separator with flotation-stages disposed downstream, from which solid-matter-foam having been developed by using gas-water mixers is separated, the improvement which comprises:

subjecting the sewage to an aerobic biological sewage treatment in an aerobic biological clearing stage following the heavy medium separator and a downstream anaerobic biological sewage treatment with repeated precisely controlled industrial process circulation through assigned bypasses in individual clearing stages in which sewage water suctioned off from the aerobic biological clearing stage leads back together with a mixture of commercial oxygen from a gas-water mixer and clear water into the aerobic biological clearing stage; and monitoring the sewage flow through the individual treatment stages with sensors and feeding thus determined values to a process control unit for regulating the sewage flow.

2. The method according to claim 1, which comprises adding aerated clarified water to the sewage water with a gas-water mixer after flowing through (the physical processing stages) before flowing into a pre-flotation mixing basin with a reaction chamber connected thereto.

3. The method according to claim 2, which comprises delivering the sewage water from the mixing basin with the reaction chamber connected thereto to a discharge basin.

4. The method according to claim 2, which comprises adding aerated clarified water to the sewage water with a gas-water mixer after flowing through the anaerobic biological clearing stage and before flowing into a mixing basin.

5. The method according to claim 4, which comprises delivering the sewage water from the mixing basin to a reaction chamber of a reflotation apparatus.

6. The method according to claim 5, which comprises separating solid-matter foam at the reaction chamber connected to the pre-flotation mixing basin, at the aerobic biological clearing stage and at the reaction chamber of the reflotation apparatus, and treating the solid-matter foam in a separate biological clearing stage according to its chemical composition and with bacteria used in the separate biological clearing stage.

7. The method according to claim 5, which comprises separating solid-matter foam at the reaction chamber connected to the pre-flotation mixing basin, at the aerobic biological clearing stage and at the reaction chamber of the reflotation apparatus, and treating the solid-matter foam according to its chemical composition and according to respective bacteria therein.

8. The method according to claim 1, which comprises defining a normal oxygen saturation of the sewage water and circulating the sewage water in the aerobic biological clearing stage with on-demand control until an oxygen enrichment is reached being a multiple of the normal oxygen saturation, and deoxidizing the sewage water in the anaerobic biological sewage treatment down to an oxygen index of nearly zero.

9. The method according to claim 8, which comprises circulating the sewage water up to ten times an hour.

10. The method according to claim 1, which comprises automatically initiating at least one of a blockage of the sewage water recycling from a clarified water discharge basin to a reservoir and a blockage of a clarified water outlet of the clarified water discharge basin, if pre-set water values are not met, with simultaneous retention of operation and supply of the biological clearing stages.

11. The method according to claim 1, which comprises additionally treating impurities with gas following the heavy medium separator.

12. The method according to claim 1, which comprises additionally treating impurities with commercial oxygen following the heavy medium separator.

13. The method according to claim 1, which comprises additionally treating impurities in industrial waste with gas prior to the aerobic and anaerobic biological sewage treatment.

14. The method according to claim 1, which comprises additionally chemically treating impurities in industrial waste with commercial oxygen prior to biological clearing.

15. The method according to claim 1, which comprises treating solids and foam to reduce a final volume of sludge or disposable waste in an additional biological clearing stage with aerobic and anaerobic treatment and discharging wet solids for further treatment or land fill.

* * * * *